United States Patent
Hussain (10) Patent No.: US 11,073,108 B2
(45) Date of Patent: Jul. 27, 2021

(54) LOUVRE OFFTAKE ARRANGEMENT

(71) Applicant: ROLLS-ROYCE plc, London (GB)

(72) Inventor: Zahid M Hussain, Derby (GB)

(73) Assignee: ROLLS-ROYCE plc, London (GB)

( * ) Notice: Subject to any disclaimer, the term of this patent is extended or adjusted under 35 U.S.C. 154(b) by 169 days.

(21) Appl. No.: 16/374,816

(22) Filed: Apr. 4, 2019

(65) Prior Publication Data

US 2019/0338728 A1 Nov. 7, 2019

(30) Foreign Application Priority Data

May 3, 2018 (GB) .................................... 1807267

(51) Int. Cl.
*F02K 3/075* (2006.01)
*F02K 1/12* (2006.01)

(52) U.S. Cl.
CPC ................. *F02K 3/075* (2013.01); *F02K 1/12* (2013.01)

(58) Field of Classification Search
None
See application file for complete search history.

(56) References Cited

U.S. PATENT DOCUMENTS

| | | | | |
|---|---|---|---|---|
| 4,544,098 A | * | 10/1985 | Warburton | F02K 1/1223 239/127.3 |
| 5,706,649 A | * | 1/1998 | Robinson | F02K 1/008 239/265.13 |
| 5,913,808 A | * | 6/1999 | Seyfang | F02C 7/04 137/15.1 |
| 8,418,471 B2 | | 4/2013 | Baltas | |
| 10,487,690 B2 | * | 11/2019 | Woolworth | F02C 7/18 |
| 2004/0195443 A1 | * | 10/2004 | Lair | F02K 1/70 244/110 B |
| 2006/0288688 A1 | * | 12/2006 | Lair | F02K 1/58 60/226.2 |
| 2008/0028763 A1 | | 2/2008 | Schwarz et al. | |
| 2008/0080967 A1 | | 4/2008 | Urbassik et al. | |
| 2009/0007567 A1 | | 1/2009 | Porte et al. | |
| 2010/0139243 A1 | * | 6/2010 | Migliaro, Jr. | F02K 1/12 60/226.3 |
| 2010/0180573 A1 | * | 7/2010 | Ruston | F02K 3/075 60/226.3 |
| 2010/0199633 A1 | | 8/2010 | Martensson et al. | |
| 2011/0262265 A1 | * | 10/2011 | Avenell | F02K 1/822 415/115 |

(Continued)

FOREIGN PATENT DOCUMENTS

EP 3 106 646 A1 12/2016

OTHER PUBLICATIONS

Sep. 5, 2019 Search Report issued in European Patent Application No. 19167081.

(Continued)

*Primary Examiner* — Michael Lebentritt
(74) *Attorney, Agent, or Firm* — Oliff PLC (57) ABSTRACT

A louvre offtake arrangement for a gas turbine engine includes a first duct, where a primary flow flows; a second duct, defining an offtake, connected to the first duct at an inlet; and a plurality of louvres arranged at the inlet. At least one louvre protrudes from the second duct into the first duct to divert part of the primary flow towards the second duct.

19 Claims, 5 Drawing Sheets

(56) References Cited

U.S. PATENT DOCUMENTS

| | | | |
|---|---|---|---|
| 2012/0073262 A1* | 3/2012 | Bulin | F02K 1/70 60/226.2 |
| 2012/0102915 A1* | 5/2012 | Baltas | F02K 3/06 60/226.3 |
| 2013/0269366 A1* | 10/2013 | Haugen | F02C 3/13 60/783 |
| 2014/0360158 A1* | 12/2014 | Gonidec | F02K 1/70 60/226.2 |
| 2016/0177833 A1* | 6/2016 | Simon-Delgado | F01D 5/085 415/1 |
| 2017/0107943 A1 | 4/2017 | Franer et al. | |
| 2017/0321602 A1* | 11/2017 | Guijarro Valencia | B64D 33/02 |
| 2018/0038279 A1 | 2/2018 | Joshi et al. | |
| 2019/0145316 A1* | 5/2019 | Schwarz | F02C 9/18 60/728 |

OTHER PUBLICATIONS

Oct. 31, 2018 Search Report issued in Great Britain Patent Application No. GB1807267.8.

* cited by examiner

LOUVRE OFFTAKE ARRANGEMENT

CROSS-REFERENCE TO RELATED APPLICATIONS

This specification is based upon and claims the benefit of priority from UK Patent Application Number 1807267.8 filed on 3 May 2018, the entire contents of which are incorporated herein by reference.

BACKGROUND

1. Field of the Disclosure

The present disclosure concerns gas turbine engines and, in particular, louvre offtake arrangements to be used in gas turbine engines.

2. Description of the Related Art

A gas turbine engine generally comprises, in axial flow series, an air intake, a fan, one or more compressors, a combustor, one or more turbines, and an exhaust nozzle. Air entering the air intake is accelerated by the fan to produce two air flows: a first air flow (core engine flow) into compressor and a second air flow (bypass flow) which passes through a bypass duct to provide propulsive thrust. Air entering the compressor is compressed, mixed with fuel and then fed into the combustor, where combustion of the air/fuel mixture occurs. The high temperature and high energy exhaust fluids are then fed to the turbine, where the energy of the fluids is converted to mechanical energy to drive the compressor in rotation by suitable interconnecting shaft.

Gas turbine engines comprise offtakes to take flow from a first duct and direct it through a second duct to other parts of the engine, for example for cooling and sealing purposes. The flow needs to present a minimum level of total pressure to be used for such cooling and sealing purposes.

The second duct comprises an inlet where a plurality of louvres is arranged flush with the first duct internal wall. The louvres causes a drop in the total pressure of the flow in the second duct, which is typically a fraction of the total pressure of the flow in the first duct. If the total pressure of the flow in the first duct is too low, the total pressure of the flow in the second duct may drop below an acceptable level, failing to provide sufficient cooling or sealing.

Accordingly it is desirable to provide an improved louvre offtake arrangement for gas turbine engines.

SUMMARY

According to a first aspect, there is provided a louvre offtake arrangement for a gas turbine engine comprising a first duct, where a primary flow flows; a second duct, defining an offtake, connected to the first duct at an inlet; and a plurality of louvres arranged at the inlet. At least one louvre of the plurality of louvres protrudes from the second duct into the first duct to divert part of the primary flow towards the second duct.

Each of the plurality of louvres may have an aerofoil shape featuring a leading edge and a trailing edge.

The leading edge may be more rounded than the trailing edge. Having the leading edge more rounded than the trailing edge may allow to reduce losses and optimise the airflow.

The leading edge of at least one louvre of the plurality of louvres may be arranged in the first duct. The trailing edge of at least one louvre of said plurality of louvres may be arranged in the second duct.

At least one louvre of said plurality of louvres may have the leading edge in the first duct and the trailing edge in the second duct.

The inlet may comprise a leading edge and a trailing edge and a line between the leading edge of the inlet and the leading edge of a last louvre close to the trailing edge of the inlet may form with an inner surface of the first duct an angle α greater than 0°, for example comprised between 1° and 45°, or between 1° to 30°.

In the present application, a chordwise direction is a direction extending between the leading edge and the trailing edge of the louvre. Moreover, in the present application, downstream and upstream is with respect to the primary flow.

The louvres may be mutually spaced by 5 to 50 mm, for example 10 to 30 mm.

A mean chord profile of the louvres may be curved or rectilinear. In other words, the means points of the mean chords of the louvres may lie on a curved or rectilinear line.

In transversal cross-section, the leading edges of the louvres may be arranged on a curved or rectilinear line.

In transversal cross-section, the trailing edges of the louvres may be arranged on a curved or rectilinear line.

In transversal cross-section, the trailing edges of the louvres may be arranged on a rectilinear line at the inlet.

A distance between the leading edge of the louvres and the inlet may progressively increase from a first louvre close to the leading edge of the inlet to a last louvre close to the trailing edge of the inlet. In other words, the first louvre may be the closest louvre to the leading edge of the inlet and the last louvre may be the closest louvre to the trailing edge of the inlet.

The louvres may have different length in the chordwise direction. For example, the length in the chordwise direction of the louvres may progressively increase from a first louvre close to the leading edge of the inlet to a last louvre close to the trailing edge of the inlet. The louvres may feature a triangular configuration.

The leading edge of the first louvre may be flush with an inner wall of the first duct, while the leading edges of the louvres other than the first louvre may protrude from the second duct into the first duct.

The leading edges of the louvres may be curved or straight. For example, the leading edges of the louvres may be curved, each leading edge having a specific curvature. The leading edges of the louvres may lay on one plane.

The louvres may be mobile independently or in group to vary a position of the leading edges with respect to the inlet.

The louvre offtake arrangement may further comprise an actuator to move the louvres, independently or in group, from a first position to a second position. The louvres may protrude in the first duct both in the first position and in the second position. For example, in the second position the louvres may protrude in the first duct more than in the first position.

The actuator may move the louvres, independently or in group, from a first position wherein the louvres may be flush with the inlet and a second position wherein the louvres may protrude in the first duct. For example, in the first position the leading edges of the louvres may be flush with the inlet. In the second position the leading edges of the louvres may protrude, or, in other words, may be arranged, in the first duct. In the second position at least some of the trailing edges may be arranged in the second duct, or aligned along the inlet of the second duct. Alternatively, all of the trailing edges may be arranged in the second duct, or aligned along the inlet of the second duct.

The louvre offtake arrangement may further comprise a louvre casing to support the plurality of louvres. The louvres may be fixed to the louvre casing. For example, the louvres may be integral with the louvre casing.

Alternatively, the louvre may be mobile with respect to the louvre casing. For example, the louvre may rotate, individually or in group, with respect to the louvre casing to change an angle of attack of the louvres relative to the primary flow. Furthermore, the louvre casing may be mobile with respect to the first duct, to change the angle of attack of the louvres relative to the primary flow. For example, the louvre casing may be rotatable to make the louvres to protrude more or less into the first duct.

The louvre offtake arrangement may further comprise vanes arranged in the second duct to guide a secondary flow flowing through the second duct.

The louvre offtake arrangement according to the first aspect shall capture a greater level of total pressure then a set of louvres flush with the inlet. According to a second aspect, there is provided a gas turbine engine comprising an air intake, a fan, one or more compressors, a combustor, one or more turbines, an exhaust nozzle and a louvre offtake arrangement according to the first aspect.

The gas turbine engine may further comprise a bypass duct and the bypass duct may define the first duct of the louvre offtake arrangement of the first aspect.

The bypass duct may comprise an outer wall and an inner wall and the inlet of the louvre offtake arrangement of the first aspect may be achieved in the inner wall of the bypass duct.

The gas turbine engine may further comprise at least one outlet guide vane arranged downstream of the fan between the outer wall and the inner wall of the bypass duct. The inlet of the louvre offtake arrangement may be arranged downstream of the at least one outlet guide vanes.

The at least one outlet guide vanes may have a chordwise length L. The inlet of the louvre offtake arranged may be arranged downstream of said at least one outlet guide vane at a distance comprised between 0.1 L and 5 L, preferably 0.1 L and 3 L, more preferably 0.1 L and 1 L.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor. The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm, or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31 or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of from 13 to 16, or 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds), for example in the range of from 1800K to 1950K. The maximum TET in use of the engine may be, for example, at least (or on the order of) any of the following:

1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disk or a bladed ring. Any suitable method may be used to manufacture such a bladed disk or a bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24, or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9. Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 degrees C. Purely by way of further example, the cruise conditions may correspond to: a forward Mach number of 0.85; a pressure of 24000 Pa; and a temperature of −54 degrees C. (which may be standard atmospheric conditions at 35000 ft).

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
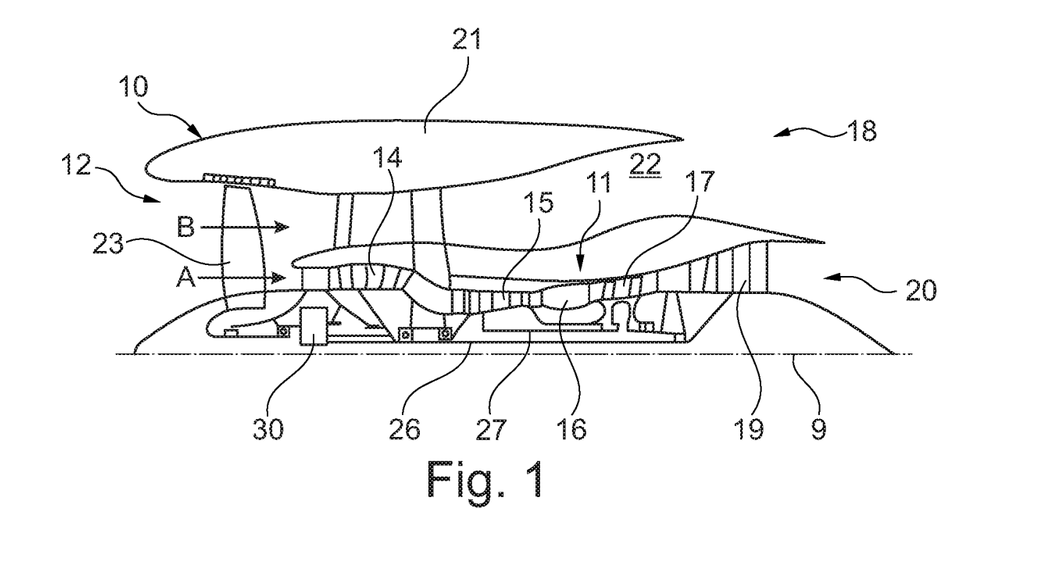
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
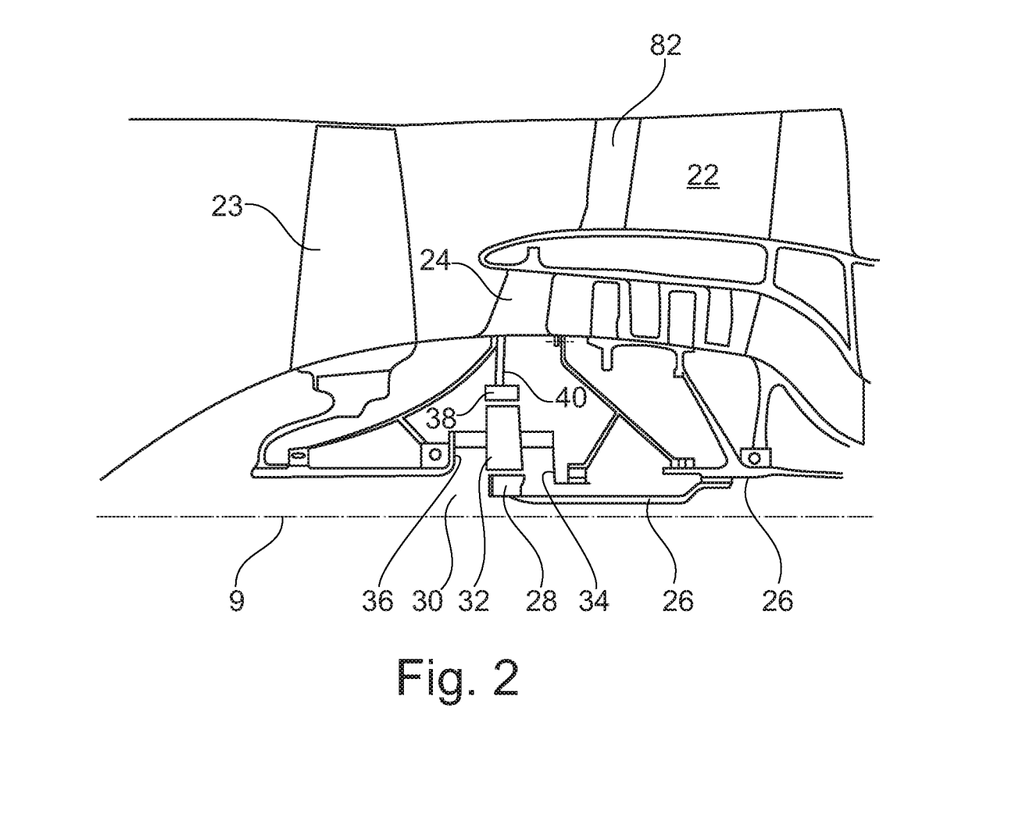
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
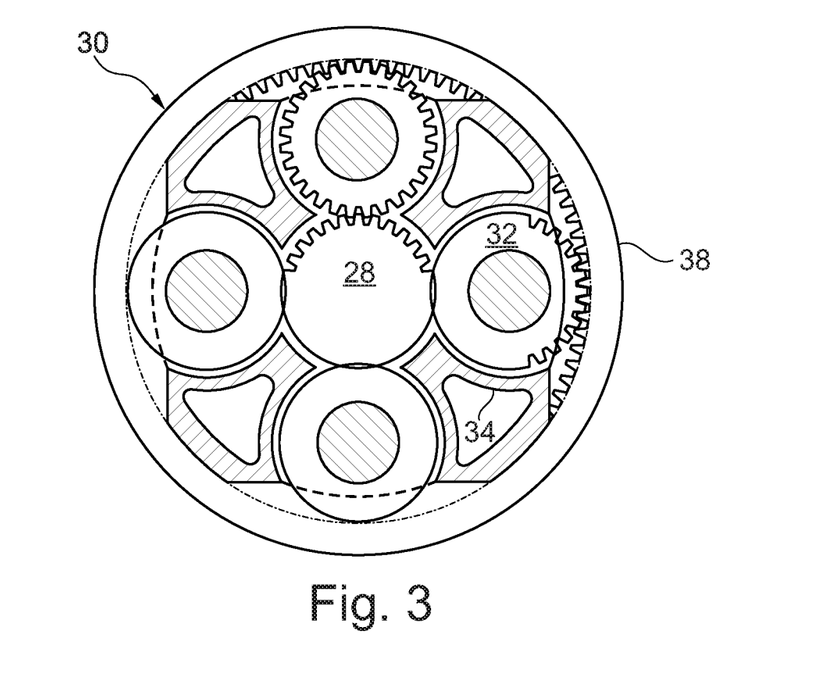
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
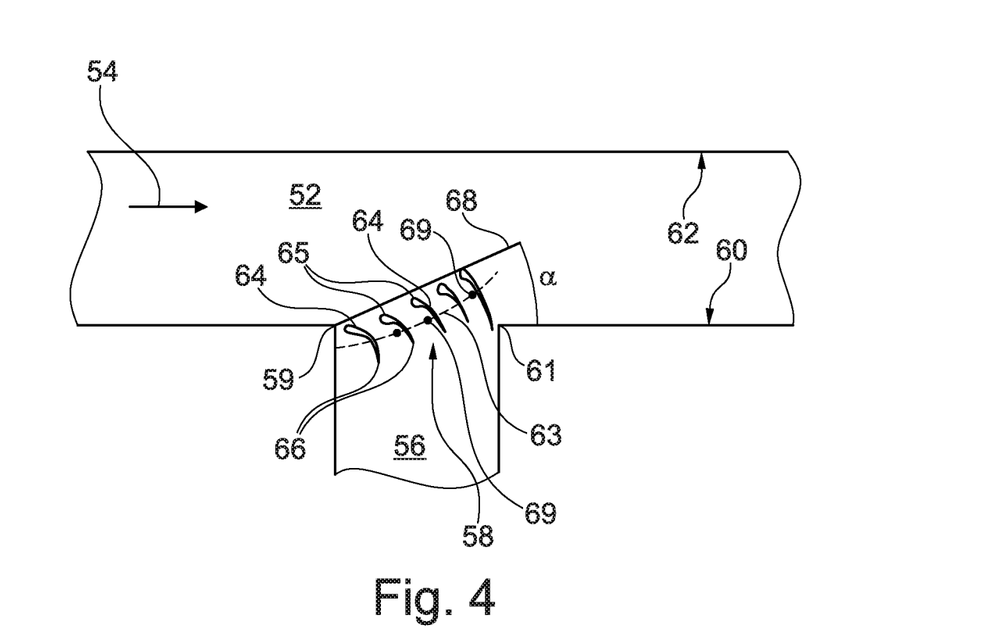
FIG. 4 is a sectional side view of a louvre offtake arrangement according to a first embodiment.
Figure 5:
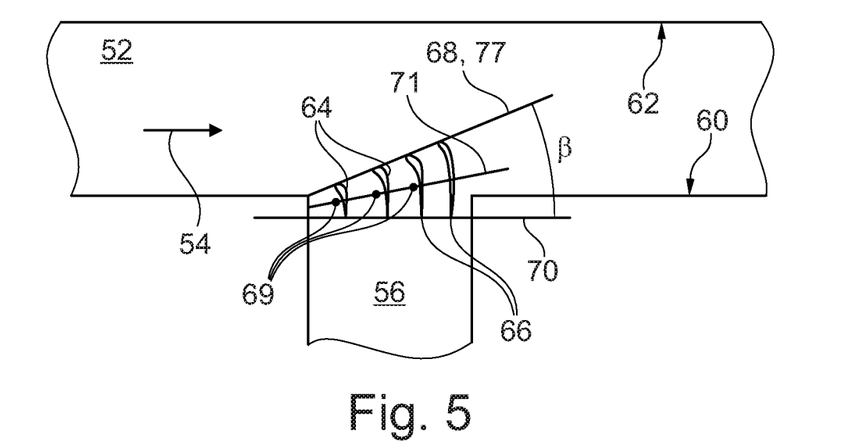
FIG. 5 is a sectional side view of a louvre offtake arrangement according to a second embodiment.
Figure 6:
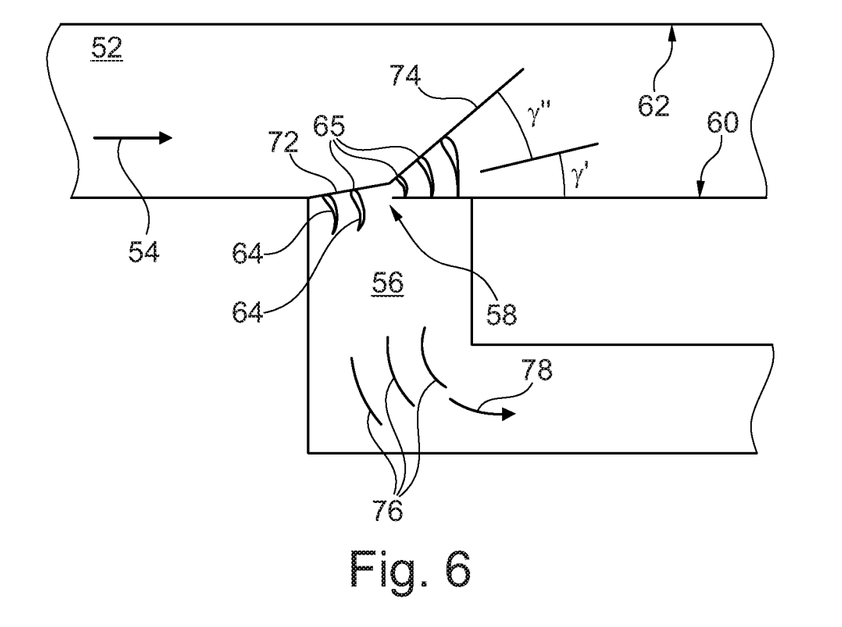
FIG. 6 is a sectional side view of a louvre offtake arrangement according to a third embodiment.
Figure 7:
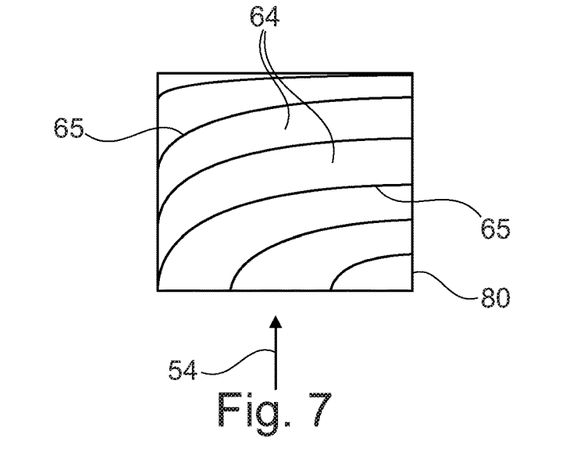
FIG. 7 is a top view of a louvre casing with respective louvres.
Figure 8:
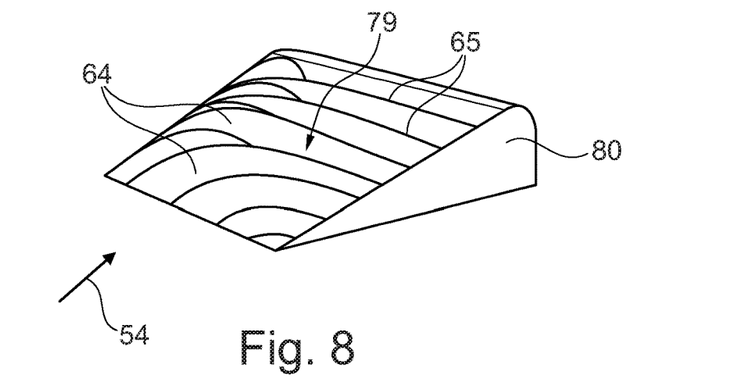
FIG. 8 is an isometric view the louvre casing of FIG. 7.

Referring to FIGS. 4 to 6, a louvre offtake arrangement comprises a first duct 52 wherein a primary flow 54 flows, and a second duct 56 connected to the first duct 52 at an inlet 58. The second duct 56 defines an offtake. The first duct 52 comprises an inner surface 60 and an outer surface 62. The second duct 56 is connected to the inner surface 60 of the first duct 52. The inlet 58 is achieved in the inner surface 60 of the first duct 52.

The second duct 56 extends transversely from the first duct 52. The second duct 56 may extend in any direction from the first duct 52.

The inlet 58 features a leading edge 59 and a trailing edge 61, the leading edge 59 being upstream of the trailing edge 61 with respect to the primary flow 54.

The louvre offtake arrangement further comprises a plurality of louvres 64 arranged at the inlet 58. The louvres 64 have an aerofoil shape featuring a leading edge 65 and a trailing edge 66. The louvres 64 may be equal in size and/or shape (as illustrated in FIGS. 4 and 6) or may change in size and/or shape (as illustrated in FIGS. 5 and 6). For sake of simplicity, hereinafter the louvre closest to the leading edge 59 of the inlet 58 will be referred to as first louvre, and the louvre closest to the trailing edge 61 of the inlet 58 will be referred to as last louvre. For example, the louvres 64 may increase in size from the first louvre to the last louvre. Moreover, the louvres 64 may be equally oriented to the primary flow 54, or each louvre 64 may feature a specific angle of attack. The louvres 64 are designed and positioned to divert part of the primary flow 54 from the first duct 52 to the second duct 56.

A line 68 between the leading edge 59 of the inlet 58 and the leading edge 65 of the last louvre 64 forms an angle α with the inner surface 60 of the first duct 52. The angle α may be greater than 0°, for example comprised between 1° and 45°, preferably between 1° and 30°.

The louvres 64 of FIG. 4 are arranged such that respective mean chord points 69 lie on a curved line 63.

Moreover, the first louvre 64 is positioned flush with the inlet 58. More particularly, the leading edge of the first louvre 64 is positioned flush with the inlet 58.

The louvres 64 other than the first louvre 64 protrude into the first duct 52. In an alternative non illustrated embodiment, the first louvre may protrude into the first duct 52.

In FIG. 5, there is illustrated an embodiment wherein the louvres 64 are different in size. The louvres 64 feature a triangular configuration. In detail, the louvres 64 are arranged such that the trailing edges 66 are aligned along a trailing edge direction 70 angled by an angle β with the line 68 between the leading edge 59 of the inlet 58 and the leading edge 65 of the last louvre 64.

The angle β may be comprised between 1° and 45°, preferably between 1° and 30°. For example, the trailing edge line 70 may be parallel to the inner surface 60 of the first duct 52. Moreover, in the embodiment of FIG. 5 the leading edges 65 of the louvres 64 are aligned on a leading edge direction 77 coinciding with the line 68. In other not illustrated embodiments, the leading edges 65 of the louvres 64 may still be aligned on a straight leading edge direction, but not coinciding with the line 68.

Moreover, the mean chord points 69 of the louvres 64 are aligned along a single straight line 71.

Referring to FIG. 6, the louvres 64 are arranged in groups, the louvres of each group being arranged according to different orientation. In detail, the louvres 64 of a first group feature leading edges 65 aligned along a first straight line 72, and the louvres 64 of a second group feature leading edges 65 aligned along a second straight line 74. The first straight line 72 may be angled to the inner wall 60 of the first duct 52 by an angle γ' greater than 0°, for example comprised between 1° and 30°, or between 1° and 15°. Moreover, the first straight line 72 may be angled to the second straight line 74 by an angle γ" greater than 0°, for example comprised between 5° and 45°, or between 10° and 30°. In the illustrated embodiment, the angle γ' is smaller than the angle γ". In other embodiments, the angle γ' may be greater than the angle γ".

The louvres 64 of the first group may have the same shape and size, while the louvres 64 of the second group may have different size and different shape. The trailing edges of the louvres 64 of the second group may be aligned on a line parallel to the inner wall 60 of the inner duct 52.

The arrangement of FIG. 6 further comprises vanes 76 arranged in the second duct 56 to improve aerodynamics of a secondary flow 78 flowing through the second duct 56. It will be appreciated that the vanes 76 can take a variety of forms and that can be applied to any of the embodiments previously illustrated. For example, the vanes 76 may feature an aerofoil profile with a suction side and a pressure side.

Referring to FIGS. 7 to 10, the louvres 64 can be made integral with a louvre casing 80, which in turn may be fitted into the inlet 58. The louvres 64 feature curved leading edges 65 to improve aerodynamics of the flow towards the second duct 56, in particular if any swirl is present in the primary flow 54. The leading edges 66 of the louvres 64 lie on a plane 79.

The louvre casing 80 and associated louvres 64 feature a wedge shape.

Figure 9:
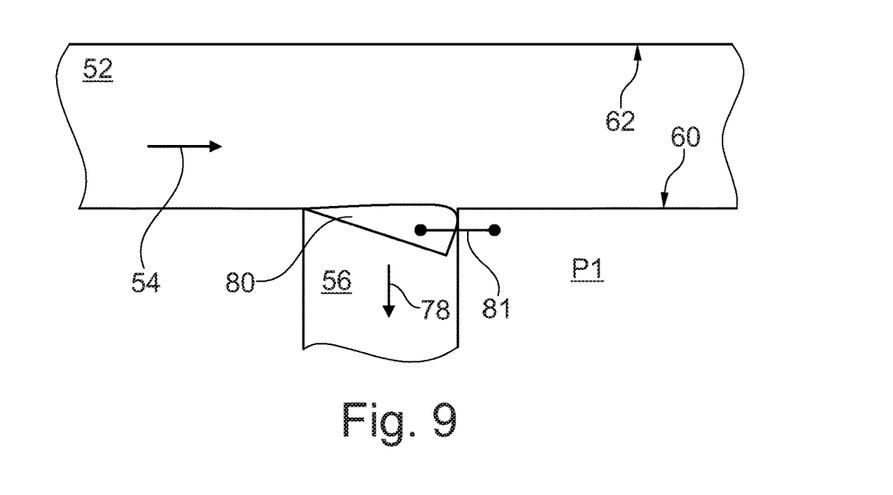
FIG. 9 is a sectional side view of a louvre offtake arrangement with the louvre casing in a first position.
Figure 10:
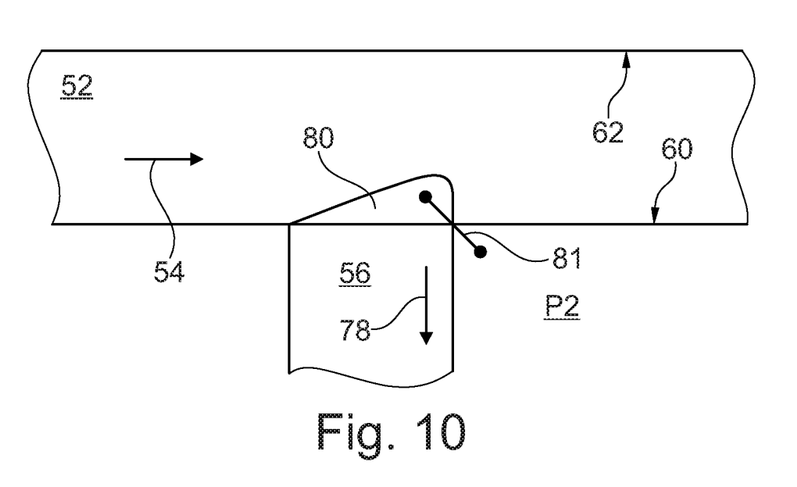
FIG. 10 is a sectional side view of the louvre offtake arrangement with the louvre casing of FIG. 9 in a second position.

The louvre casing 80 is mobile between a first position P1 and a second position P2. In the first position P1, the louvre casing 80 is positioned flush with the inner wall 60 of the first duct 52, such to capture a small level of total pressure from the primary flow 54 compared to a greater level of total pressure the louvre casing 80 can capture in the second position P2, wherein the louvre casing 80 protrudes from the second duct 56 into the primary flow 54. In particular, the louvre casing 80 is mobile in rotation substantially about the leading edge 59 of the inlet 58 so as to vary the angle α and, therefore, the level of total pressure of the secondary flow 78 in the second duct 56. An actuator 81 moves the louvre casing 80 between the first position P1 and the second position P2.

Figure 11:
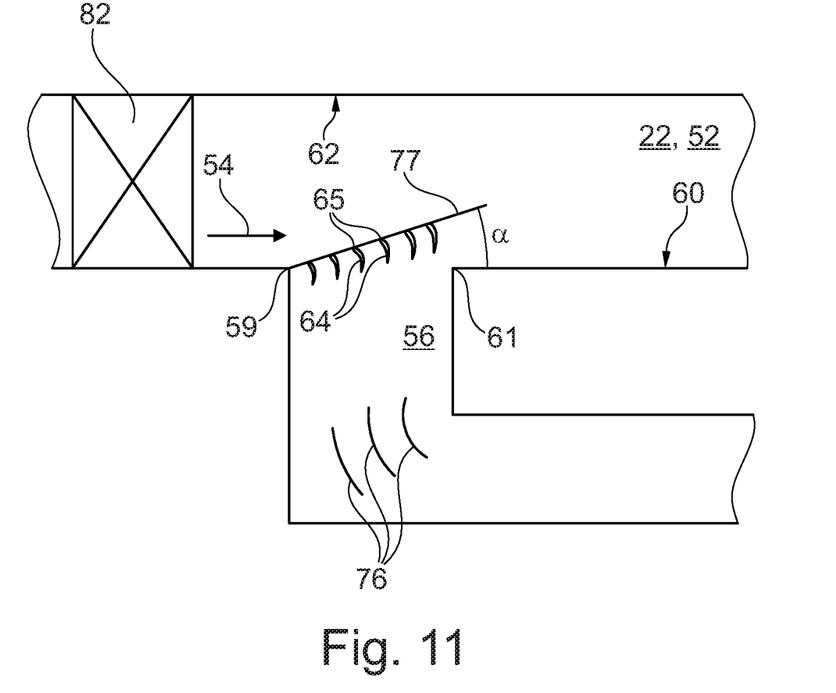
FIG. 11 is a sectional side view of a louvre offtake arrangement positioned in a bypass duct of a gas turbine engine.

Referring to FIG. 11, there is illustrated a louvre offtake arrangement positioned in the gas turbine engine 10, in particular downstream of an outlet guide vane 82. The bypass duct 22 defines the first duct (52) of the louvre offtake arrangement. The second duct 56 takes flow from the bypass 22 and direct it to other parts of the engine, for example for cooling and sealing purposes. To improve efficiency, the second duct 56 comprises vanes 76 of the type previously described.

The leading edges 65 of the louvres 64 are aligned along a rectilinear leading edge direction 77.

Although illustrated with same shape and size and with the leading edges 65 aligned along the rectilinear leading edge direction 77, the louvres 64 may have different shape and size and be arranged with different orientation, for example as the louvres of any of the previously illustrated arrangements. Moreover, the louvre offtake arrangement may be arranged in other parts of the engine 10, for example to take flow from the core engine flow.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A louvre offtake arrangement for a gas turbine engine comprising:
   a first duct, where a primary flow flows,
   a second duct, defining an offtake, connected to the first duct at an inlet, and
   a plurality of louvres arranged at the inlet;
   wherein at least one louvre of said plurality of louvres protrudes from the second duct into the first duct to divert part of the primary flow towards the second duct, and
   wherein the inlet comprises a leading edge and a trailing edge, and a first louvre of the plurality of louvres closest to the trailing edge extends further into the first duct than a second louvre of the plurality of louvres closest to the leading edge.

2. The louvre offtake arrangement according to claim 1, wherein each of said plurality of louvres has an aerofoil shape featuring a leading edge and a trailing edge, the leading edge of at least one louvre of said plurality of louvres being arranged in the first duct, and/or the trailing edge of at least one louvre of said plurality of louvres being arranged in the second duct.

3. The louvre offtake arrangement according to claim 2, wherein in transversal cross-section the trailing edges of the louvres are arranged on a rectilinear line at the inlet.

4. The louvre offtake arrangement according to claim 2, wherein a distance between the leading edge of the louvres and the inlet progressively increases from the second louvre to the first louvre.

5. The louvre offtake arrangement according to claim 2, wherein the leading edges of the louvres are curved or straight.

6. The louvre offtake arrangement according to claim 2, wherein a line between the leading edge of the inlet and the leading edge of the first louvre a last louvre forming with an inner surface of the first duct an angle $\alpha$ greater than 0°, for example comprised between 1° and 45°, or between 1° and 30°.

7. The louvre offtake arrangement according to claim 6, wherein a mean chord profile of the louvres is curved or rectilinear.

8. The louvre offtake arrangement according to claim 7, wherein in transversal cross-section the leading edges of the louvres are arranged on a curved or rectilinear line.

9. The louvre offtake arrangement according to claim 8, wherein in transversal cross-section the trailing edges of the louvres are arranged on a curved or rectilinear line.

10. The louvre offtake arrangement according to claim 1, wherein the louvres are mobile independently or in group to vary a position of the leading edges with respect to the inlet.

11. The louvre offtake arrangement according to the claim 10, further comprising an actuator to move the louvres, independently or in group, from a first position to a second position.

12. The louvre offtake arrangement according to claim 11, wherein the actuator moves the louvres from a first position wherein the louvres are flush with the inlet and a second position wherein the louvres protrude in the first duct.

13. The louvre offtake arrangement according to claim 1, further comprising vanes arranged in the second duct to guide a secondary flow flowing through the second duct.

14. A gas turbine engine comprising an air intake, a fan, one or more compressors, a combustor, one or more turbines, an exhaust nozzle, and a louvre offtake arrangement according to claim 1.

15. The gas turbine engine according to claim 14, further comprising a bypass duct and wherein the bypass duct defines the first duct of the louvre offtake arrangement.

16. The gas turbine engine according to claim 15, wherein the bypass duct comprises an outer wall and an inner wall, the inlet of the louvre offtake arrangement being achieved in the inner wall of the bypass duct.

17. The gas turbine engine according to claim 16, further comprising at least one outlet guide vane arranged downstream of the fan between the outer wall and the inner wall of the bypass duct, wherein the inlet of the louvre offtake arrangement is arranged downstream of the at least one outlet guide vane.

18. The gas turbine engine according to claim 17, wherein the at least one outlet guide vane has a chordwise length L and wherein the inlet of the louvre offtake arrangement is arranged downstream of said at least one outlet guide vane at a distance comprised between 0.1 L and 5 L.

19. The louvre offtake arrangement according to claim 1, wherein the plurality of louvres progressively extend further into the first duct from the second louvre to the first louvre.

* * * * *